Aug. 5, 1952  A. A. SCHULLER  2,605,903
FILTER
Filed June 22, 1948  3 Sheets-Sheet 1
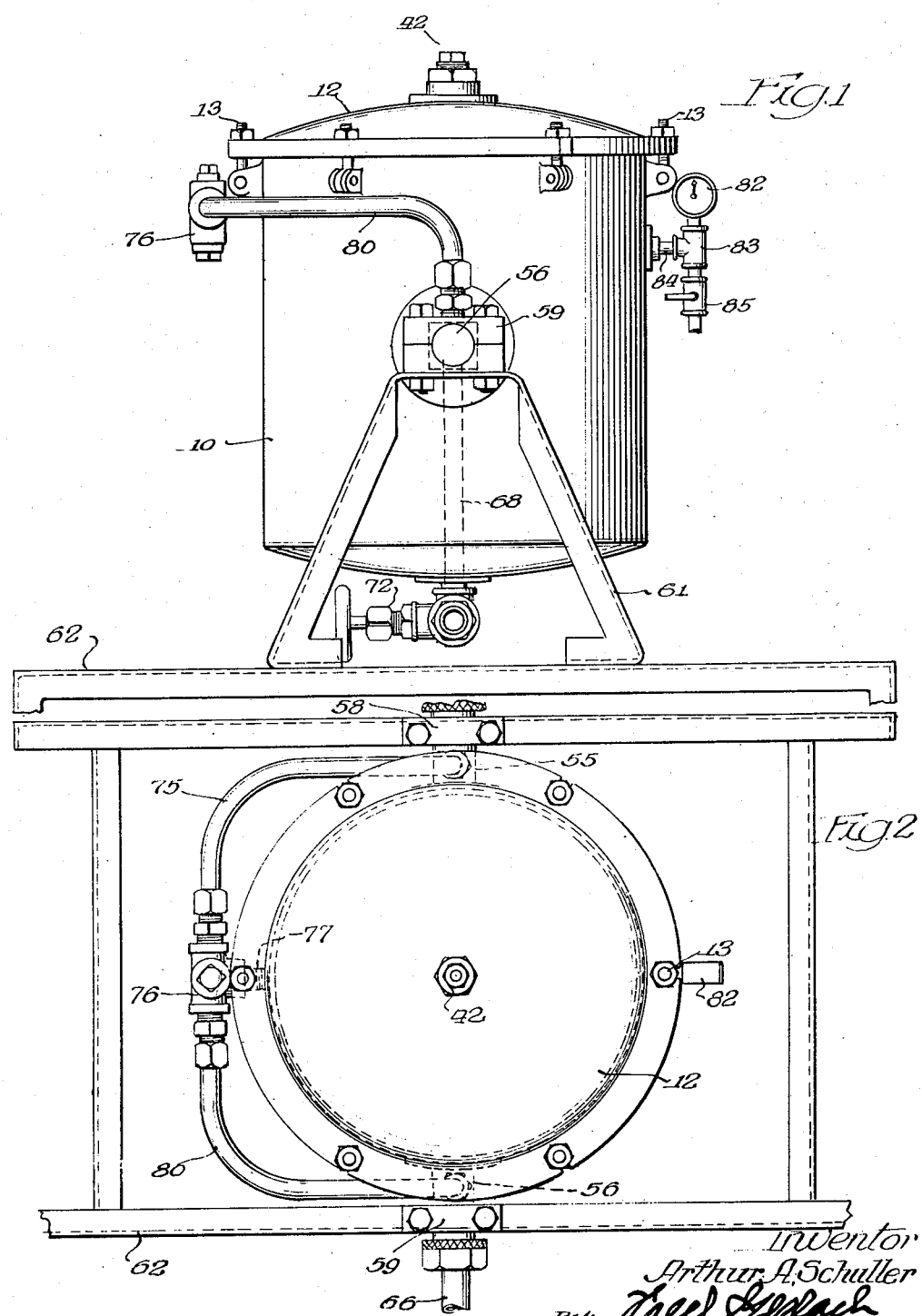
Inventor
Arthur A. Schuller
By: Fred Gerlach
atty.

Aug. 5, 1952 A. A. SCHULLER 2,605,903
FILTER
Filed June 22, 1948 3 Sheets-Sheet 2

Inventor
Arthur A. Schuller
By Fred Gerlach
Atty.

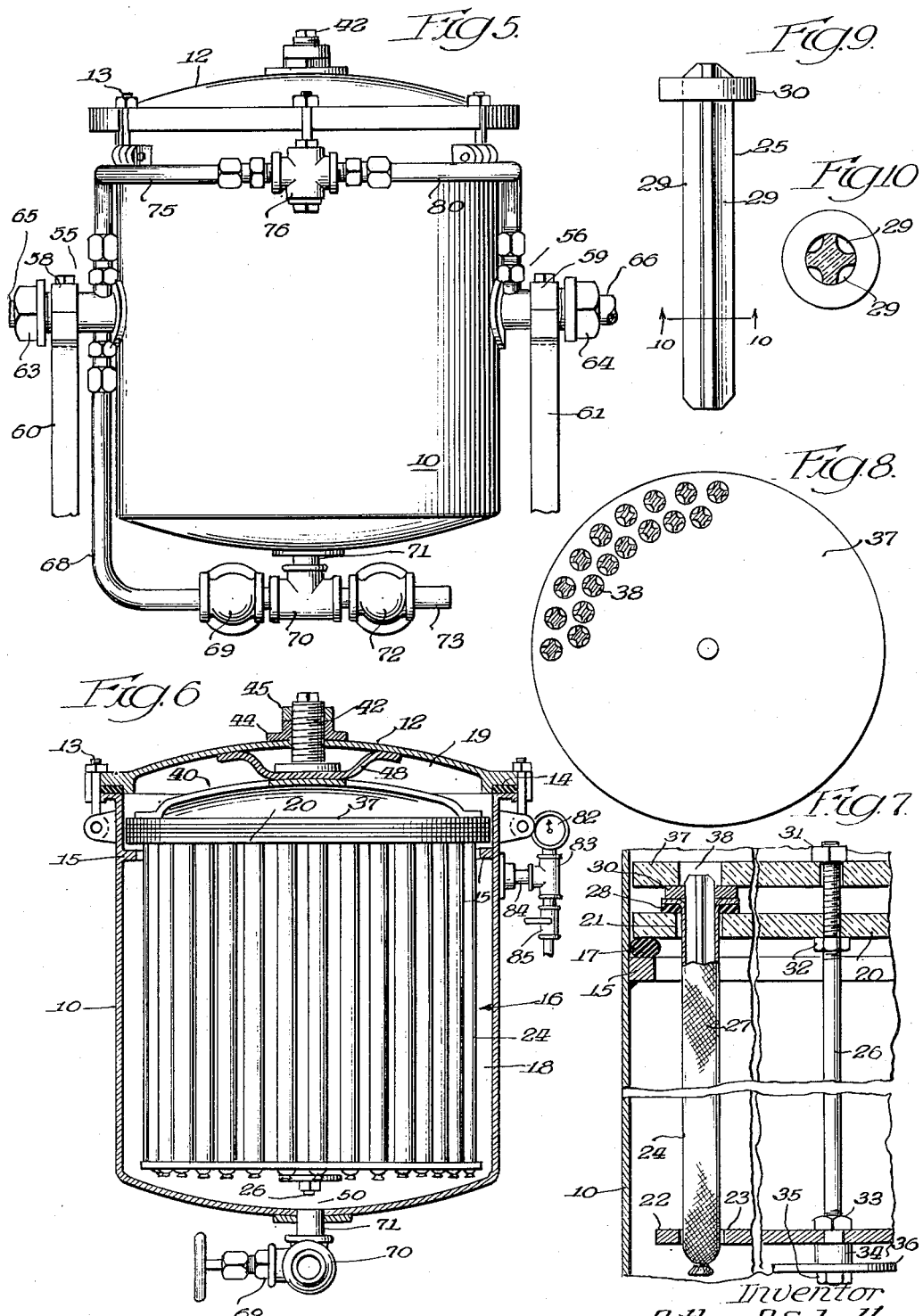

Patented Aug. 5, 1952

2,605,903

UNITED STATES PATENT OFFICE 2,605,903

FILTER

Arthur A. Schuller, Chicago, Ill.

Application June 22, 1948, Serial No. 34,363

5 Claims. (Cl. 210—180)

This invention relates to enclosed tank type pressure filters and has for its primary object to provide a filter construction which affords a maximum filter area per unit of volume, without sacrifice of sludge carrying capacity.

Another object is to provide an enclosed tank type pressure filter which is capable of being operated in a manner which makes it possible to salvage substantially all of the liquid entering the filter.

A further object is to provide an enclosed tank type pressure filter which is adapted to operate on liquid containing large percentages of contaminating solids which ordinarily would tend to form impervious coatings on the filter elements and consequently impair their capacity to pass normal quantities of filtrate per unit area.

An additional object is to provide an enclosed tank type pressure filter comprising a large number of vertical elongate filter elements mounted to form a self-contained unit which can quickly be removed, as a whole, from the pressure tank, and quickly replaced.

Still another object is to provide an enclosed tank type pressure filter wherein the filter elements can be quickly and effectively cleaned.

In the preferred embodiment of my invention, hereinafter described, by way of example, I have provided a tank type pressure filter wherein the tank is mounted on trunnions and is thus invertible, and which, consequently, enables the salvaging of the tail end portion of each batch of liquid, which tail end portions could not, in many instances, otherwise be successfully salvaged—thus accomplishing substantial savings, especially where the liquid to be filtered is costly.

Another feature of my invention resides in a novel and improved self-contained and removable filter unit which makes possible the realization of a very large filter area per unit volume and at the same time greatly simplifies maintenance of the filter, in that the filter elements can quickly be removed and replaced and provided with new pervious sleeves when needed.

Still another important feature resides in a novel piping system which enables the filter tank to be inverted without altering any pipe connections and involving nothing more than the opening and closing of a few valves in shifting from a filtering operation to a filter cleaning operation and vice-versa.

Additional objects and features of my invention will be elucidated as the ensuing detailed description proceeds.

In the drawings which accompany this specification:

Fig. 1 is an elevational view showing in normal operating position an invertible filter embodying the invention;

Fig. 2 is a plan view;

Fig. 5 is an elevational view of the filter taken from the left-hand side of Fig. 1;

Fig. 6 is a vertical section through the filter, except that the filter unit, per se, is shown in elevation;

Fig. 7 is an enlarged fragmentary sectional view showing details of the filter unit construction;

Fig. 8 is a plan view of the compression plate forming a part of the filter unit;

Fig. 9 is an elevational view of a filter element core or baffle; and

Fig. 10 is a transverse section taken at line 10—10 of Fig. 9.

Figures 3, 4:
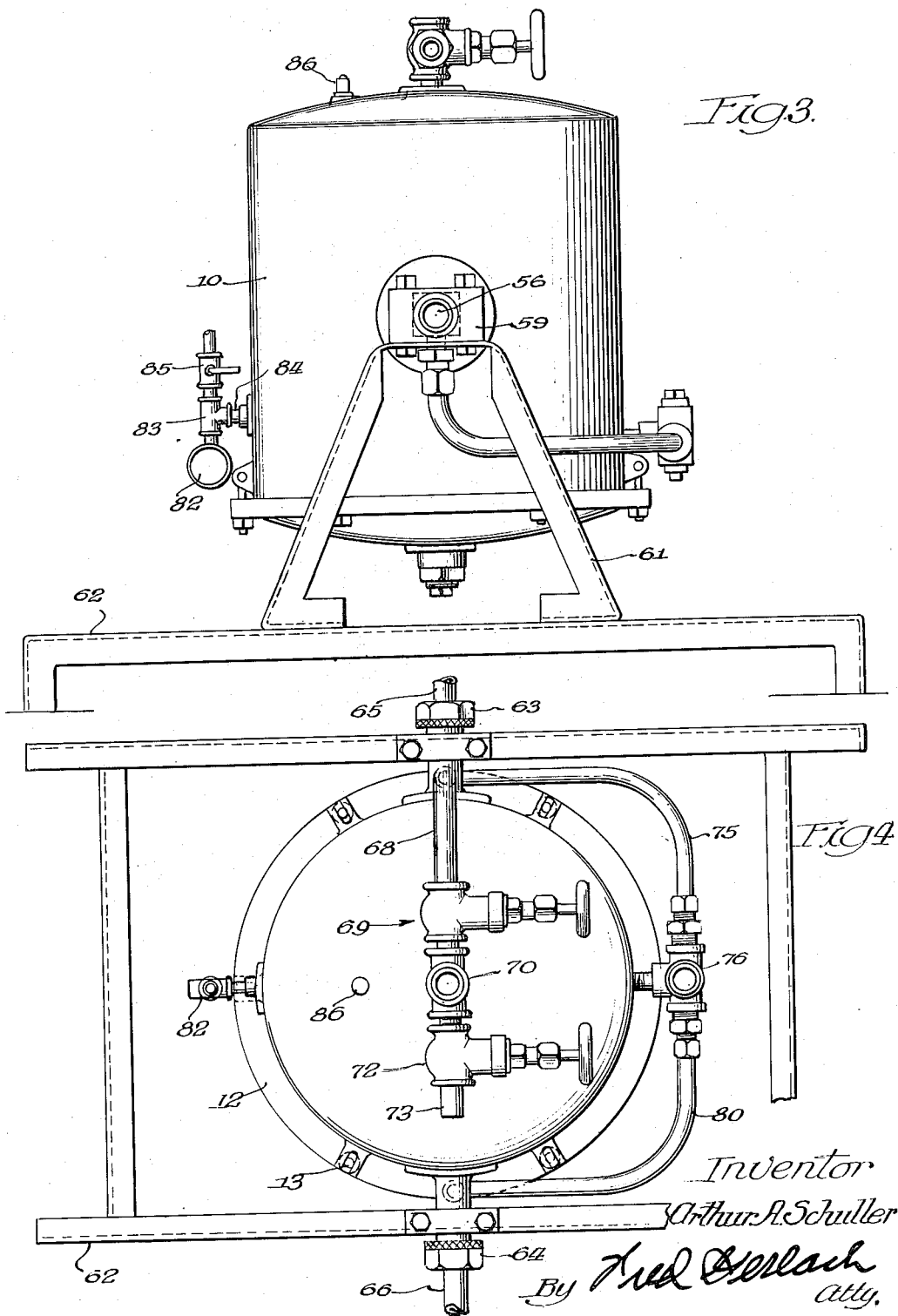
Fig. 3 is an elevational view corresponding to Fig. 1 but showing the filter inverted.
Fig. 4 is a view of the bottom of the filter tank, as seen when looking down on Fig. 3.

The cylindrical cup-shaped pressure type filter tank 10 is provided with an upwardly bulged cover 12 which is removable secured thereon by a plurality of hinged clamp bolts 13. An annular gasket 14 is interposed between the margin of the cover and the rim of the side wall of the tank and serves to render the tank pressure tight.

Welded to the upper end of the tank side wall at a point a small distance beneath the frame thereof is an inwardly extending shelf-forming flange 15 on which is removably seated a self-contained filter unit 16, which can be withdrawn as a whole from the tank upon removal of the cover 12. An annular gasket 17 rests upon the flange 15 and provides a pressure-tight seal between the compartments 18 and 19 in the lower and upper portions of the tank, respectively.

The self-contained, removable filter unit 16 (details of which are shown in assembled relation in Fig. 7) comprises a circular filter element supporting plate 20, a filter element spacer plate 22, a compression plate 37, and a large number of filter elements 24, together with a central tie-bolt 26 by means of which the plates 20 and 22 are secured together in laterally spaced relation, as shown.

The supporting plate 20 normally rests on the gasket 17 and is provided with a large number of circular openings 21 through each of which extends the upper end of one of the filter elements 24; and the spacer plate 22 is provided with a similar number of circular openings 23, each to receive the lower end of one of the filter elements.

Each of the filter elements 24 comprises a long, somewhat tenuous core 25 which is known in the art as a baffle and is enclosed within a close fitting pervious tubular sleeve 27, the lower end of which is closed and the upper end of which extends through the adjacent opening 21 and is flared outwardly and gripped between an annular gasket 28 and a collar 30 which is firmly secured to the upper end portion of the core in any suitable manner. Each core or baffle 25 is formed to provide a plurality of grooves 29 extending from end to end thereof. The cores or baffles 25 and collars 30 may be of any suitable material, depending in some instances upon the chemical character of the filtrate. A "plastic" such as Nylon is an excellent material for the purpose when its use is permissible from a chemical standpoint. The tubular sleeves 27 may be of any suitable woven or knitted fabric, Nylon being preferred whenever its use is chemically permissible.

The tie-bolt 26 is threaded at both ends and is anchored by means of its upper thread to the supporting plate 20, through which it passes, as clearly shown in Fig. 7, and is locked to said supporting plate by means of a nut 32. The threaded portion of said tie-bolt projecting upwardly from the supporting plate 20 passes through a central opening in the compression plate 37 and is provided with a nut 31 which serves to secure the compression plate in place. The threaded lower end of the tie-bolt passes through a central opening in the spacer plate 22 and said spacer plate is clamped between two nuts 33 and 34 on the lower threaded end of the tie-bolt. A circular baffle plate 36 is mounted on the lower end of the tie-bolt and is clamped between the nut 34 and a nut 35.

The compression plate 37 overlies the upper ends of the filter elements 24 and has circular openings 38 corresponding numerically to the filter elements and so spaced that each is aligned with one of the filter elements and one of the openings 21 in supporting plate 20. Each opening 38 is large enough to receive the upper end of one of the filter element cores or baffles 25, but small enough so that the compression plate bears on the collar 30—thus pressing said collar down and thereby gripping the subjacent outwardly flared end of the tubular pervious sleeve 27 between said collar and the gasket 28. Obviously, no liquid can pass from compartment 18 into compartment 19, or vice versa, except by way of the interstices of the sleeves 27 and the grooves 29 in the baffles 25.

The compression plate 37 is held under pressure by a spider 40 which bears against said plate near its margin and is, in turn, engaged centrally by a compression screw 42. The later extends through an opening in the central portion of the cover 12 and is in threaded relation with a flanged sleeve 44 which is welded to said cover. A nut 45 serves to lock the compression screw; and a flexible diaphragm 48 functions as a seal to prevent leakage along the thread of the compression screw 42.

In operation, the liquid to be filtered enters the compartment 18 through an intake port 50 in the central portion of the bottom wall of the tank, Fig. 6, and fills said compartment. It then passes under pressure, through the interstices of the numerous sleeves 27 and thence by way of the grooves 29 of the cores 25 into the compartment 19.

Ordinarily it is necessary to deposit on the exterior surface of each sleeve a continuous coating of filter aid, such, for instance, as diatomaceous earth, and this may be done by mixing the filter aid with a batch of the liquid to be filtered and re-cycling the batch through the filter until the filtrate is clear—which condition indicates that the filter elements are adequately coated. But when the liquid to be filtered has a greasy or slimy content or an extraordinary percentage of solid matter which would be apt to clog the interstices of the sleeve fabric and thereby render the filter elements impervious, I have found that such results can be avoided by first cycling through the filter a mixture consisting of filter aid and clean water or a clear solvent of the liquid to be filtered. This procedure serves to coat the sleeves of the filter elements with the filter aid, thus shielding the sleeve fabric from contamination; and thereafter the grease or slime or other solid contaminators mixed with additional filter aid will deposit on the coated sleeves without clogging the interstices thereof. This also tends to increase the useful life span of the sleeves by excluding foreign matter which is incapable of being readily dislodged.

For maximum filtering capacity the filter elements should be closely spaced, so as to realize as much filter surface area as may be feasible within a given volume; but it is not expedient to space them so closely that the coatings of filter aid and filtered out solids will quickly bridge the spaces between the filter elements. Manifestly, if said spaces become bridged the effective filter area is reduced; and if they become completely filled the filter will cease entirely to function. The optimum spacing depends upon the character of the liquid to be filtered. If it contains a comparatively large percentage of solids it is likely to be more economical to increase the filter element spacing and thereby increase the quantity of liquid stock which can be handled before cleaning the filter. On the other hand, if the batches of liquid to be filtered are not too large and it is necessary to clean the filter between consecutive batches, it may be feasible to space the elements closely, even though the solid content of the liquid is high. The closer the filter elements are spaced, in a tank of given size, the greater will be the filter surface area and, consequently, the higher will be the rate of flow; but if a high flow rate is thus achieved at the cost of frequent shut-downs for cleaning, it may well be that nothing will be gained from the high flow rate. Experience in the handling of any given liquid stock will soon indicate the optimum spacing for that particular stock.

The lateral spacings commonly employed between adjacent filter elements ranges from one-half inch to one inch and in the average case may appropriately be about three-fourths inch. This data will serve as an adequate guide for those skilled in the art and capable of exercising good judgment based upon experience in filter operation. The diameter of the cores or baffles 25 may conveniently and appropriately be of the order of one-half inch in most cases. By utilizing relatively small diameter round or square baffles a greater filter area can be realized within a given volumetric space than is possible with large baffles or with baffles of the flat plate type.

Two diametrically opposite trunnions 55 and 56 are fixedly secured to opposite sides of the tank 10 and journaled in bearings 58 and 59 which, in turn, are supported on structural steel standards 60 and 61, placed at either side of the tank. As shown in the drawings the standards are mounted on any suitable base such as the structural framework 62. The filter tank is invertible on its trunnions and is shown inverted in Fig. 3. In Fig. 1 it is shown top side up which is the posture in which the primary filtering operation takes place, as well as the pre-coating operation.

The two trunnions are bored axially from their outer ends to points near their respective inner ends, and they are provided with stuffing boxes 63 and 64 through which extend, respectively, two pipes 65 and 66. The pipe 65 constitutes a supply conduit and the pipe 66 constitutes a discharge conduit.

A pipe 68 is connected at one end to the trunnion 55 so as to communicate with the bore thereof, and is connected at its other end through a valve 69, a T-fitting 70 and a nipple 71 to the port 50 in the bottom wall of the tank 10. A normally closed discharge valve 72 is connected to one branch of the T-fitting 70 and may be provided with a short length of pipe 73.

A pipe 75 is connected at one end to the trunnion 55 so as to communicate with the bore thereof, and at the other end to one port of a three-way valve 76 which, as best shown in Fig. 2, has its side outlet connected through a nipple 77 with the upper compartment 19 in the filter tank. A pipe 80 is connected at one end to the trunnion 56 so as to communicate with the bore thereof, and at its other end to another port of the three-way valve 76. By rotating the plug of the valve 76, the pipes 75 and 80 can be connected, alternatively, through said valve, with the compartment 19.

The pipe 65 is the filter intake and the pipe 66 is the filter discharge. The liquid to be filtered enters the bore of the trunnion 55 through the pipe 65 and then passes via pipe 68, valve 69, T-fitting 70 and nipple 71 into the lower compartment 18 where it impinges against the baffle plate 36. The latter prevents the incoming stream of liquid from directly contacting the filter elements and possibly dislodging the filter aid coating thereon or preventing complete formation of the desired coating.

The valve 72 is closed while filtering is in progress; and the three-way valve 76 is so adjusted that there is no flow through the pipe 75.

When the lower compartment 18 is filled with liquid under pressure, the liquid is forced through the filter aid coatings and the interstices of the numerous fabric sleeves 27 and thence into the grooves 29 of the cores or baffles 25 and upwardly along said grooves into the upper compartment 19. From the latter the filtrate passes via three-way valve 76 and the pipe 80 to the bore of the trunnion 56 and then through the discharge pipe 66. The latter may be connected to a slurry tank, not shown, in which the liquid to be filtered is mixed with filter aid, and from which the mixture is pumped to the intake pipe 65. Usually, the liquid with the filter aid content is re-cycled between the slurry tank and the filter until all of the filter aid has been removed from the liquid and deposited on the filter elements as a uniform coating; and thereafter liquid without filter aid can be pumped through the filter either until a batch has been completed or until so much solid matter has been deposited on the filter elements that the filter no longer functions efficiently.

A pressure gauge 82 is connected through the medium of a T-fitting 83 and a nipple 84 to the tank 10 and communicates with the compartment 18 at a level near the top thereof, as shown in Fig. 6; and a petcock 85 is connected to one branch of the T-fitting 83, enabling relief of the pressure within said compartment, or admission of air thereto when draining.

In order to achieve depositions of filter aid and contaminating matter of uniform thickness on the surfaces of the filter elements, it is necessary that the direction of liquid flow be upward; but in so operating it is not possible to force through the filter the tail end portion of any batch of liquid, unless the filter is inverted. With a non-invertible filter there would, in each instance, remain in the compartment 18 a substantial residue of unfiltered liquid, which may be of considerable value; and in many cases it is not permissible to drain out the residue and mix it with the next succeeding batch. But the construction herein described permits the filter tank to be quickly inverted, whereupon air under pressure may be admitted to the compartment 18 through an air valve 86, thus forcing the residue of unfiltered liquid through the filter elements and into compartment 19 and thence out of the filter tank by way of the valve 76, pipe 80 and discharge pipe 66.

After completing the previously described pre-coating operation with clean water or solvent containing filter aid, as in preparation for the filtering of liquids containing large quantities of grease or other solid matter, it may be desirable to rid the filter of the residue of water or solvent remaining therein so that the liquid thereafter to be filtered will not be diluted thereby; and in that event it is necessary only to invert the filter and force out the residue of water or solvent by introducing air or steam under pressure into compartment 18 through the valve 86. Following such an operation, the filter can be turned top side up without danger of any of the precoat dropping off, because the precoat is then sufficiently dry to adhere firmly to the filter element sleeves.

When, however, the filter is being inverted, while filled with liquid, after a coating of filter aid has been deposited on the filter elements, it is necessary to maintain pressure in the compartment 18 by keeping the pump in operation, otherwise, the wet coatings of filter aid on the filter elements are likely to disintegrate and drop off in spots.

Cleaning and reconditioning of the filter, preparatory to the next filtering operation, is carried out with the tank 10 top side up and is accomplished by backwashing with water, or with some other suitable liquid in event the use of water is not permissible. To perform a backwashing operation, the three-way valve 76 is adjusted to permit liquid flow through the pipe 75, the valve 69 is closed and the valve 72 is opened. Water or other liquid under pressure is then admitted through the intake pipe 65, and the course of flow is via the pipe 75 and the valve 76 into the compartment 19 and then down through the filter unit into compartment 18 and out through the valve 72 and the pipe 73. The pressure thus applied interiorly of the filter elements causes the fabric sleeves to expand, thereby breaking up the coatings thereon, and the resultant rubble is washed out through the drain.

While I have illustrated and described only one exemplification of my invention, it will be apparent that there are many possible alternatives and modifications within the scope and purview thereof and, accordingly, the invention

I claim:

1. A pressure type filter comprising in combination a supporting structure provided with a pair of horizontally aligned and spaced apart bearings, a tank disposed between the bearings and consisting of a continuous side wall, a bottom wall at one end of the side wall and a removable cover at the other end of said side wall, a removable unitary filter unit disposed within the tank, embodying a supporting plate connected to, and extending across the tank side wall at a point a small distance from the cover and dividing the tank interior into a lower compartment between it and the bottom wall and an upper compartment between it and the cover, and also embodying a plurality of spaced apart porous filter elements connected to, and normally depending from, the supporting plate and serving to establish communication between the compartments, a pair of horizontal tubular trunnions connected fixedly to, and projecting outwards from, diametrically opposite portions of the tank side wall at points between the supporting plate and the tank bottom wall, provided with closed inner ends, and mounted in said bearings so that they support the tank so that it is capable of being tilted back and forth between a normal position wherein the bottom wall is at the bottom and an inverted position wherein the bottom wall is at the top, a supply conduit connected to, and communicating with, one of the trunnions, a discharge conduit connected to, and communicating with, the other trunnion, a first pipe connected to, and communicating with, the one trunnion and the lower compartment, provided with a valve, and adapted when the tank is in its normal position and its valve is open to deliver liquid to be filtered from the supply conduit to the lower compartment for up-flow through the filtering elements into the upper compartment, a second pipe connected to, and communicating with, the upper compartment and the other trunnion, provided with valve means therefor, adapted when the tank is in its normal position and its valve means is open to conduct filtered liquid from said upper compartment to the discharge conduit, and also adapted when the tank is in its inverted position and its valve means is open to drain residual liquid from the two compartments to said discharge conduit, a drain pipe connected to the bottom wall, leading to atmosphere, and provided with a normally closed valve, and a third pipe connected to, and communicating with, said one trunnion and the upper compartment, provided with valve means therefor, and adapted when the tank is in its normal position, its valve means and the drain pipe valve are open and the valve in the first pipe and the valve means for the second pipe are closed to deliver back washing liquid under pressure from said supply conduit to the upper compartment for down flow through the elements into the lower compartment and thence through the drain pipe.

2. A pressure type filter comprising in combination a supporting structure provided with a pair of horizontally aligned and spaced apart bearings, a tank disposed between the bearings and consisting of a continuous side wall, a bottom wall at one end of the side wall and a removable cover at the other end of said side wall, a removable unitary filter unit disposed within the tank, embodying a supporting plate connected to, and extending across the tank side wall at a point a small distance from the cover and dividing the tank interior into a lower compartment between it and the bottom wall and an upper compartment between it and the cover, and also embodying a plurality of spaced apart porous filter elements connected to, and normally depending from, the supporting plate and serving to establish communication between the compartments, a pair of horizontal tubular trunnions connected fixedly to, and projecting outwards from, diametrically opposite portions of the tank side wall at points between the supporting plate and the tank bottom wall, provided with closed inner ends, and mounted in said bearings so that they support the tank so that it is capable of being tilted back and forth between a normal position wherein the bottom wall is at the bottom and an inverted position wherein the bottom wall is at the top, a supply conduit connected to, and communicating with, one of the trunnions, a discharge conduit connected to, and communicating with, the other trunnion, a T-fitting disposed directly exterior of the tank bottom wall and having one branch thereof in communication with the lower compartment, a first pipe connected to, and communicating with, the one trunnion and another branch of the fitting, provided with a valve, and adapted when the tank is in its normal position and its valve is open to deliver liquid to be filtered from the supply conduit to the lower compartment for up-flow through the filtering elements into the upper compartment, a second pipe connected to, and communicating with, the upper compartment and the other trunnion, provided with valve means therefor, adapted when the tank is in its normal filtering position and its valve means is open to conduct filtered liquid from said upper compartment to the discharge conduit, and also adapted when the tank is in its inverted position and its valve means is open to drain residual liquid from the two compartments to said discharge conduit, a drain pipe connected to the third branch of the fitting leading to atmosphere, and provided with a normally closed valve, and a third pipe connected to, and communicating with, said one trunnion and the upper compartment, provided with valve means therefor, and adapted when the tank is in its normal position, its valve means and the drain pipe valve are open and the valve in the first pipe and the valve means for the second pipe are closed to deliver back washing liquid under pressure from said supply conduit into the upper compartment for down flow through the elements into the lower compartment and thence through the drain pipe.

3. A pressure type filter comprising in combination a supporting structure provided with a pair of horizontally aligned and spaced apart bearings, a tank disposed between the bearings and consisting of a continuous side wall, a bottom wall at one end of the side wall and a removable cover at the other end of said side wall, a removable unitary filter unit disposed within the tank, embodying a supporting plate connected to, and extending across the tank side wall at a point a small distance from the cover and dividing the tank interior into a lower compartment between it and the bottom wall and an upper compartment between it and the cover, and also embodying a plurality of spaced apart porous filter elements connected to, and normally depending from, the supporting plate and serving to establish communication between the compartments, a pair of horizontal tubular trunnions connected fixedly to, and projecting outwards from, diametrically opposite portions of the tank side wall at points between the supporting plate and the tank bottom wall, provided with closed inner ends and mounted in said bearings so that they support the tank so that it is capable of being tilted back and forth between a normal position wherein the bottom wall is at the bottom and an inverted position wherein the bottom wall is at the top, a supply conduit connected to, and communicating with, one of the trunnions, a discharge conduit connected to, and communicating with, the other trunnion, a first pipe connected to, and communicating with, the one trunnion and the lower compartment, provided with a valve, and adapted when the tank is in its normal position and its valve is open to deliver liquid to be filtered from the supply conduit to the lower compartment for up-flow through the filtering elements into the upper compartment, a three-way valve disposed exteriorly of said other end of the tank side wall and having one port thereof connected to the upper compartment, a second pipe connected to, and communicating with, another port of the three-way valve and the other trunnion, adapted when the tank is in its normal position and the three-way valve is positioned to establish communication between the one port and said another port to conduct filtered liquid from said upper compartment to the discharge conduit, and also adapted when the tank is in its inverted position and the three-way valve is positioned as previously mentioned to drain residual liquid from the two compartments to said discharge conduit, a drain pipe connected to the tank bottom wall, provided with a normally closed valve therein, and a third pipe connected to, and communicating with said one trunnion and the third port of the three-way valve and adapted when the tank is in its normal position, the three-way valve is positioned to establish communication between the third port and said one port, the drain pipe valve is open, and the valve in the first pipe is closed to deliver back washing liquid under pressure from said supply conduit to the upper compartment for down flow through the elements into the lower compartment and thence through the drain pipe.

4. A pressure type filter comprising in combination a supporting structure provided with a pair of horizontally aligned and spaced apart bearings, a tank disposed between the bearings and consisting of a continuous side wall, a bottom wall at one end of the side wall and a removable cover at the other end of said side wall, a removable unitary filter unit disposed within the tank, embodying a supporting plate connected to, and extending across the tank side wall at a point a small distance from the cover and dividing the tank interior into a lower compartment between it and the bottom wall and an upper compartment between it and the cover, and also embodying a plurality of spaced apart porous filter elements connected to, and normally depending from, the supporting plate and serving to establish communication between the compartments, a pair of horizontal tubular trunnions connected fixedly to, and projecting outwards from, diametrically opposite portions of the tank side wall at points between the supporting plate and the tank bottom wall, provided with closed inner ends, and mounted in said bearings so that they support the tank so that it is capable of being tilted back and forth between a normal position wherein the bottom wall is at the bottom and an inverted position wherein the bottom wall is at the top, a supply conduit connected to, and communicating with, one of the trunnions, a discharge conduit connected to, and communicating with, the other trunnion, a T-fitting disposed directly exteriorly of the tank bottom wall and having one branch thereof in communication with the lower compartment, a first pipe connected to, and communicating with, the one trunnion and another branch of the fitting, provided with a valve, and adapted when the tank is in its normal position and its valve is open to deliver liquid to be filtered from the supply conduit to the lower compartment for up-flow through the filtering elements into the upper compartment, a three-way valve disposed directly exteriorly of said other end of the tank side wall and having one port thereof connected to the upper compartment, a second pipe connected to, and communicating with, another port of the three-way valve and the other trunnion, adapted when the tank is in its normal position and the three-way valve is positioned to establish communication between the one port and said another port to conduct filtered liquid from said upper compartment to the discharge conduit, and also adapted when the tank is in its inverted position and the three-way valve is positioned as previously mentioned to drain residual liquid from the two compartments to said discharge conduit, a drain pipe connected to the third branch of the fitting and provided with a normally closed valve, and a third pipe connected to, and communicating with said one trunnion and the third port of the three-way valve and adapted when the tank is in its normal position, the three-way valve is positioned to establish communication between the third port and said one port, the drain pipe valve is open, and the valve in the first pipe is closed to deliver back washing liquid under pressure from said supply conduit to the upper compartment for down flow through the elements into the lower compartment and then through the drain pipe.

5. A pressure type filter comprising in combination a supporting structure provided with a pair of horizontally aligned and spaced apart bearings, a tank disposed between the bearings and consisting of a continuous side wall, a bottom wall at one end of the side wall and a removable cover at the other end of said side wall, a removable unitary filter unit disposed within the tank, embodying a supporting plate connected to, and extending across the tank side wall at a point a small distance from the cover and dividing the tank interior into a lower compartment between it and the cover, and also embodying a plurality of spaced apart porous filter elements connected to, and normally depending from, the supporting plate and serving to establish communication between the compartments, a pair of horizontal tubular trunnions connected fixedly to, and projecting outwards from, diametrically opposite portions of the tank side wall at points between the supporting plate and the tank bottom wall, provided with closed inner ends, and mounted in said bearings so that they support the tank so that it is capable of being tilted back and forth between a normal position wherein the bottom wall is at the bottom and an inverted position wherein the bottom wall is at the top, a supply conduit connected to, and communicating with, one of the trunnions, a discharge conduit connected to, and communicating with, the other trunnion, a first pipe connected to, and communicating with, the one trunnion and the lower compartment, provided with a valve, and adapted when the tank is in its normal position and its valve is open to deliver liquid to be filtered from the supply conduit to the lower compartment for up-flow through the filtering elements into the upper compartment, a second pipe connected to, and communicating with, the upper compartment and the other trunnion, provided with valve means therefor, adapted when the tank is in its normal position and its valve means is open to conduct filtered liquid from said upper compartment to the discharge conduit, and also adapted when the tank is in its inverted position and its valve means is open to drain residual liquid from the two compartments to said discharge conduit, a drain pipe connected to the bottom wall, leading to atmosphere, and provided with a normally closed valve, a third pipe connected to, and communicating with, said one trunnion and the upper compartment, provided with valve means therefor, and adapted when the tank is in its normal position, its valve means and the drain pipe valve are open and the valve in the first pipe and the valve means for the second pipe are closed to deliver back washing liquid under pressure from said supply conduit to the upper compartment for down flow through the elements into the lower compartment and thence through the drain pipe, and means independent of the first pipe and the drain pipe for introducing fluid under pressure into the lower compartment when the tank is in its inverted position.

ARTHUR A. SCHULLER.

REFERENCES CITED

The following references are of record in the file of this patent:

UNITED STATES PATENTS

| Number | Name | Date |
|---|---|---|
| 507,350 | Bohm | Oct. 24, 1893 |
| 517,240 | Roger | Mar. 27, 1894 |
| 642,907 | Holy | Feb. 6, 1900 |
| 719,438 | Crossman | Feb. 3, 1903 |
| 782,843 | Geib | Feb. 21, 1905 |
| 1,038,173 | Meade | Sept. 10, 1912 |
| 1,059,574 | Shatto | Apr. 22, 1913 |
| 1,120,629 | Salisbury | Dec. 8, 1914 |
| 1,698,743 | Sweeney | Jan. 15, 1929 |
| 1,771,928 | Jung | July 29, 1930 |
| 2,254,597 | Berger et al. | Sept. 2, 1941 |
| 2,496,370 | Baily | Feb. 7, 1950 |